United States Patent [19]
Stanton, Jr.

[11] Patent Number: 6,003,329
[45] Date of Patent: Dec. 21, 1999

[54] KILLIE SAVER

[76] Inventor: Russell H. Stanton, Jr., P.O. Box 857, Ocean Gate, N.J. 08740

[21] Appl. No.: 08/908,076

[22] Filed: Aug. 11, 1997

[51] Int. Cl.$^6$ ..................................................... F25D 3/08
[52] U.S. Cl. ............................ 62/372; 62/457.2; 43/54.1; 43/56
[58] Field of Search ..................... 43/54.1, 55, 56; 62/371, 457.2, 457.9, 372, 530

[56] References Cited

U.S. PATENT DOCUMENTS

| | | | |
|---|---|---|---|
| 2,149,482 | 3/1939 | Whitaker | 43/55 Q |
| 2,555,126 | 5/1951 | Greve | 62/457.7 |
| 2,595,726 | 5/1952 | Swanbeck | 43/56 |
| 2,853,828 | 9/1958 | Fisher | 43/56 |
| 2,935,858 | 5/1960 | Kingery | 62/371 |
| 3,959,358 | 5/1976 | Doughty | 43/55 |
| 4,128,170 | 12/1978 | Elliott | 206/315 R |
| 4,319,629 | 3/1982 | Hotta | 165/47 |
| 4,642,934 | 2/1987 | Carlson et al. | 43/55 |
| 4,697,380 | 10/1987 | Fenske | 43/55 |
| 4,870,778 | 10/1989 | Sheppard | 43/55 |
| 5,050,526 | 9/1991 | Nelson et al. | 114/364 |
| 5,052,184 | 10/1991 | Jarvis | 62/60 |
| 5,172,511 | 12/1992 | Smith et al. | 43/56 |
| 5,212,902 | 5/1993 | Moorhead et al. | 43/55 |
| 5,305,544 | 4/1994 | Testa, Jr. | 43/54.1 |

Primary Examiner—William Doerrler
Attorney, Agent, or Firm—Jacobson, Price, Holman & Stern, PLLC

[57] ABSTRACT

A killie saver including the combination of an insulated marine cooler having a pivotal lid, a generally rectangular bait container having a screened bottom at an elevated generally horizontal position within the cooler. A spacer below the bait container supports the bait container in elevated position in the cooler and defines a storage space for packaged ice in the bottom of the cooler beneath the bait container. The spacer also provides support for the bait container so that a major portion of the area of the screened bottom of the bait container is free of direct contact with the spacer.

16 Claims, 3 Drawing Sheets

KILLIE SAVER

CROSS REFERENCE TO RELATED APPLICATION

NOT APPLICABLE

STATEMENT REGARDING FEDERAL SPONSORED RESEARCH OR DEVELOPMENT

NOT APPLICABLE

BACKGROUND OF THE INVENTION

1. Field of the Invention

This invention relates to a killie saver which includes the combination of an insulated conventional marine cooler, a bait container positioned within the cooler and a spacer positioned within the cooler and supporting the bait container in elevated position above the bottom of the cooler. The spacer includes depending support legs which define an unoccupied area on the bottom of the cooler to receive a plastic bottle or bottles filled with ice. The bait container includes a screened bottom and end walls and serves to contain live bait, such as salt, brackish or fresh water minnows generally known as killifish or killies. The ice maintains the killies in live condition throughout a fishing trip.

2. Description of Related Art

Live bait containers are typically rectangular in configuration and include a screened bottom and end walls and a top wall and side walls constructed of wood. The top wall also usually includes an access opening provided with a hinged closure. Live bait containers have sufficient buoyancy to float in a body of water and may be tethered to a piling or dock for the purpose of containing and maintaining the bait alive for use when fishing.

Previously, when embarking on a fishing trip, the live bait container would be removed from the water, placed in the fishing boat and transported to a fishing site with the live bait container and the live bait therein out of the water. Upon arrival at a first fishing site the bait container is placed back in the water and tethered to the boat so that the live bait would be readily available from the bait container while fishing at that site. When moving to another fishing site, the bait container must be removed from the water, placed in the boat until the next fishing site is reached, at which time the bait container is then returned to the water.

When the bait container is removed from the water and placed in the fishing boat during transport to each fishing site, the interior of the boat is soiled by the water and waste from the live bait dripping from the bait container into the boat. Hence, a mess is made each time the bait container is removed from the water and placed within the boat for transport to the next fishing site. It is not unusual for a fisherman to forget that the bait container is in the water and tethered to the boat when moving the boat to another site which can result in loss or damage to the bait container, damage to the boat and increased fatalities of the killies due to deprivation of oxygen as they are moved rapidly through water.

Accordingly, a need exists for a structure which enables live killies to be maintained in live condition and readily accessible while reducing the messiness usually occurring on the boat deck when using live bait from a conventional bait container.

The following U.S. patents disclose various fishing bait containers for operative association with water containing pails and live wells, coolers and boat interiors. These patents also disclose buoyant live bait and fish containers, containers for fish and other items such as food and bait to which access may be quickly obtained and insulated containers for fish and water.

Swanbeck U.S. Pat. No. 2,595,726 discloses a foraminated minnow container having a top wall provided with a central access opening with which a foraminated hinged closure is operatively associated. The upper periphery of the container includes a float for floating the container in a body of water and for also supporting the container from the open upper end of an associated pail, if desired.

Carlson et al U.S. Pat. No. 4,642,934 discloses an upwardly opening fish and bait container constructed of flexible mesh and specifically adapted to be removably supported within a live well having water disposed therein.

Sheppard U.S. Pat. No. 4,870,778 discloses a flexible fabric screen live bait and fish container including a pair of relatively hinged rigid top wall sections which may be pivoted relative to each other in order to form a "briefcase" structure when not in use.

Nelson et al U.S. Pat. No. 5,050,526 discloses a combined live well for fish, bait well and ice chest specifically structured for supportive reception between the gunnels of a small fishing boat.

Elliot U.S. Pat. No. 4,128,170 discloses a combined tackle box, bait holder, cooler and seat structure presumably for use in a small fishing boat.

Smith et al U.S. Pat. No. 5,172,511 discloses a first insulated container for containing water and bait and a second container for water and ice as well as pump structure for selectively pumping water from the first container, through the second container and back into the first container, whereby the water within the first container may be cooled.

Moorhead et al U.S. Pat. No. 5,212,902 discloses a container for fish and other items which enables ready access to the interior of the container with minimal heat transfer from the exterior of the container to the interior of the container.

Testa U.S. Pat. No. 5,305,544 discloses a multi-compartment insulated chest for the storage of bait and food. The chest includes an upwardly opening lower section closed at its top by a removable upper section. A portion of the lower section can be used for storing water and live bait, and the upper section includes compartments for tackle and food. The upper section also includes an opening therethrough to provide access to live bait in the lower section without having to remove the upper section from the lower section.

The above prior U.S. patents do not disclose a killies saver which includes the combination of an insulated cooler, a live bait container inserted into the cooler, a spacer inserted into the cooler under the live bait container to space the bait container above the bottom of the cooler and a bottle or bottles of ice positioned under the spacer to maintain killies in live condition and in position for ready access when fishing.

SUMMARY OF THE INVENTION

An object of this invention to provide a killies saver including a standard size marine cooler, a bait container and a spacer to support the bait container within the cooler in an elevated position and to provide a space within the cooler beneath the spacer receiving ice to maintain the killies in live condition when fishing.

Another object of this invention is to provide a killies saver in accordance with the preceding object in which the spacer may be constructed of wood, plastic or other suitable materials.

A further object of this invention is to provide a killies saver in accordance with the preceding objects in which the bait container includes a screened bottom wall and end walls and is configured to fit neatly in the upper portion of the standard marine cooler when supported by the spacer when inserted into the cooler.

Still another object of this invention is to provide a killies saver in accordance with the preceding objects in which the bait container is supported in an elevated position within a standard marine cooler which enables circulation of air cooled by ice positioned below the spacer.

Yet another object of this invention is to provide a floatable bait container, a supporting spacer and ice bottles dimensioned and specifically adapted for fitted insertion into an insulated marine cooler without requiring any modification of the cooler.

A still further object of this invention is to provide a killies saver including a bait container, spacer and ice container for insertion into an insulated cooler and which conform to conventional forms of manufacture, be of simple construction and easy to use thereby providing a killie saver that is economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
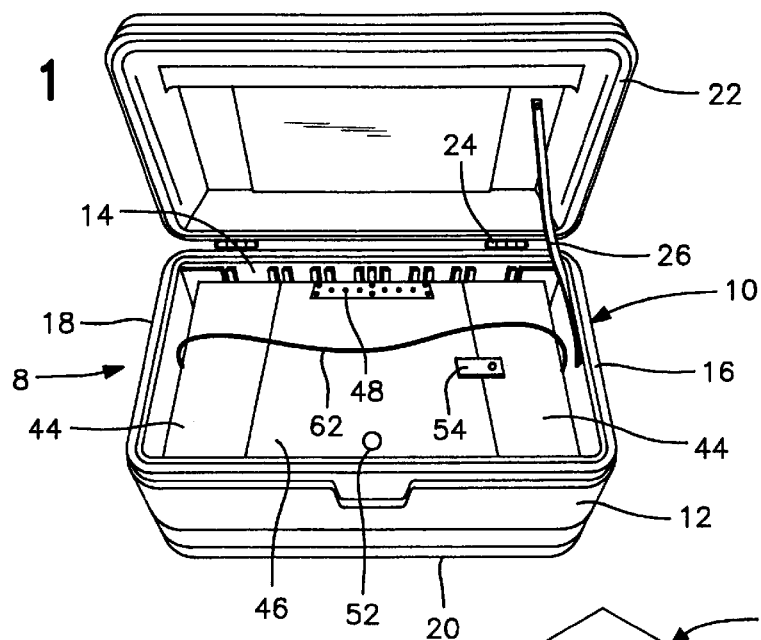
FIG. 1 is a perspective view of a typical marine cooler such as the 54 quart "Igloo" cooler with the top of the cooler in an open position with a bait container positioned in the cooler.

In describing the preferred embodiments of the present invention as illustrated in the drawings, specific terminology will be resorted to for the sake of clarity. However, the invention is not intended to be limited to the specific embodiments illustrated and terms so selected; it being understood that each specific term includes all technical equivalents which operate in a similar manner to accomplish a similar purpose.

Referring now more specifically to the drawings, the killie saver of this invention is illustrated in FIG. 1 and is designated by reference numeral 8. The killie saver includes a standard insulated cooler 10, such as a 54 quart "IGLOO" marine cooler. The cooler 10 includes upstanding front and rear walls 12 and 14 interconnected by upstanding opposite end walls 16 and 18. The peripheral walls 12, 14, 16 and 18 are interconnected at their lower margins by a bottom wall 20 and the open top of the container is closed by an insulated top or lid 22 hingedly supported from the rear wall 14 by hinges 24. A flexible strap 26 is connected between the end wall 16 and the top 22 to limit swinging movement of the top 22 to the open position thereof, as illustrated in FIG. 1. When the top 22 is closed, the interior of the cooler 10 is isolated from the surrounding atmosphere.

The cooler 10, with the top or lid 22, is preferably a conventional marine type cooler. However, cooler 10 may be any suitable standard insulated cooler having an openable top or lid. The container may also be of any standard size.

Figure 2:
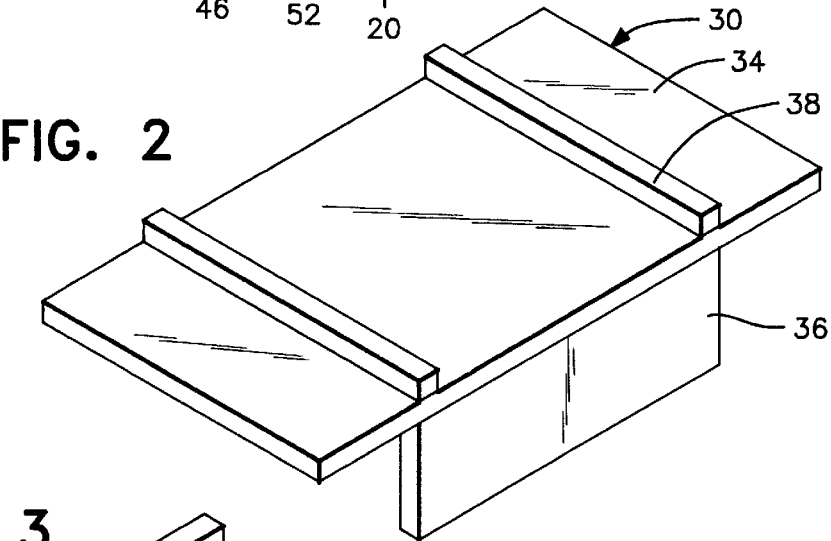
FIG. 2 is a top perspective view of the spacer to be inserted in the cooler under the bait container.
Figure 3:
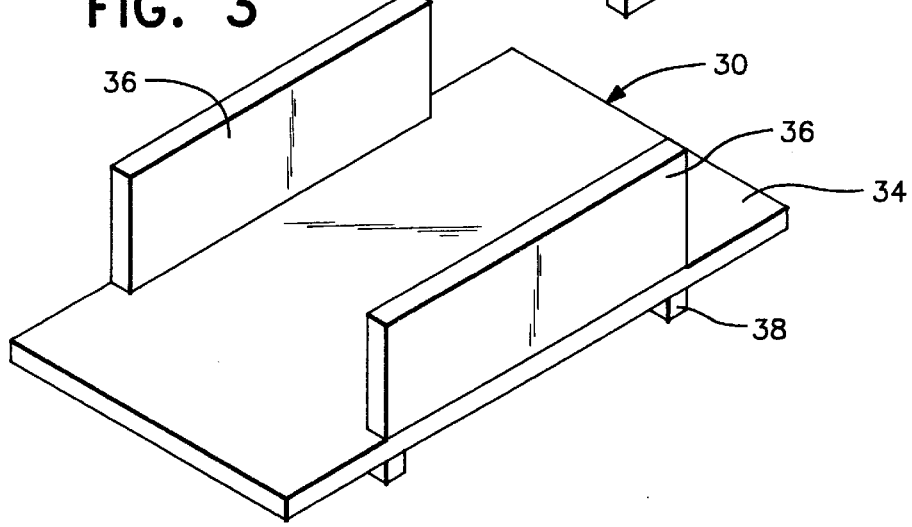
FIG. 3 is a bottom perspective view of the spacer.

As illustrated in FIGS. 2 and 3, the killie saver 8 also includes a spacer 30 or dividing board inserted into the lower portion of the cooler 10. The spacer 30 includes a generally horizontal panel 34. The longitudinal side edges of the panel 34 include depending support legs 36 generally in the form of side walls centered along the longitudinal side edges of the panel 34. Mounted on the upper surface of the panel 34 are two spacer bars 38 which extend transversely of the panel 34 in substantial registry with the opposite ends of the support legs 36. The spacer 30 is preferably constructed of marine plywood or other type wood, but may be constructed of any other suitable materials, such as plastic or the like. The spacer 30 when used in conjunction with a 54 quart marine cooler, is preferably sized to be about 11 inches wide and about 20 inches long. The support legs 36 are preferably about 12 inches long and about 4 inches high, and spacer bars 38 extend completely across panel 34 and are preferably about ⅜ inches high and about ¾ inches wide.

Figure 4:
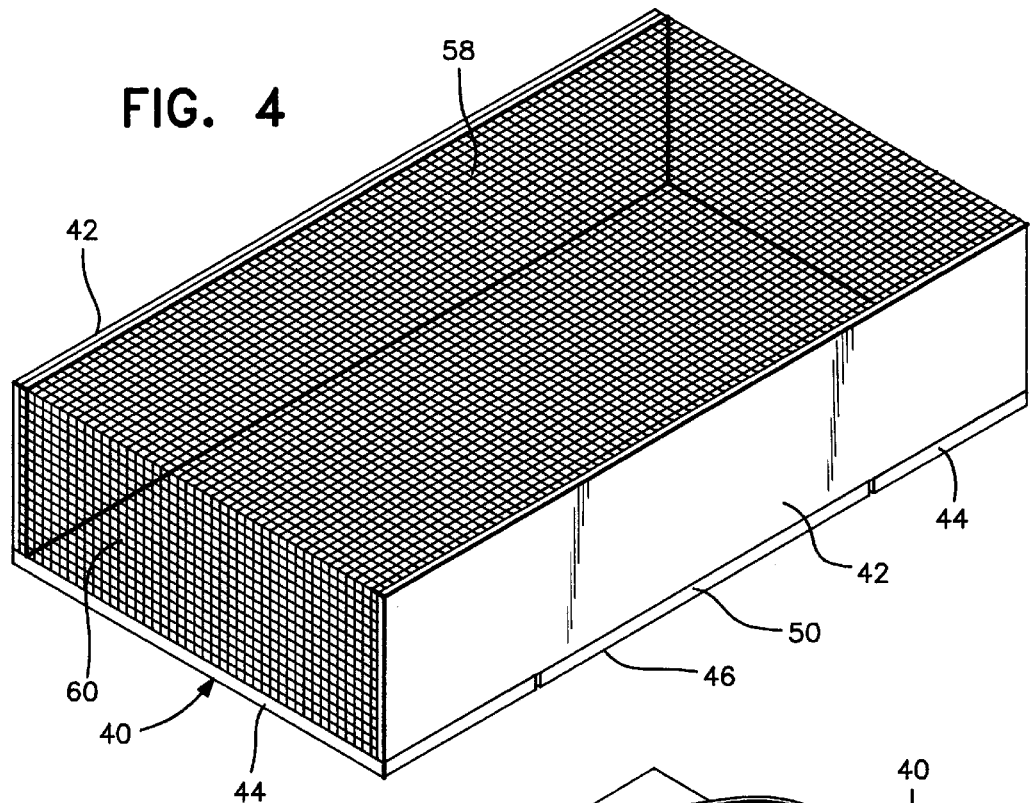
FIG. 4 is a bottom perspective view of the bait container illustrating the screened bottom wall and end walls.
Figure 5:
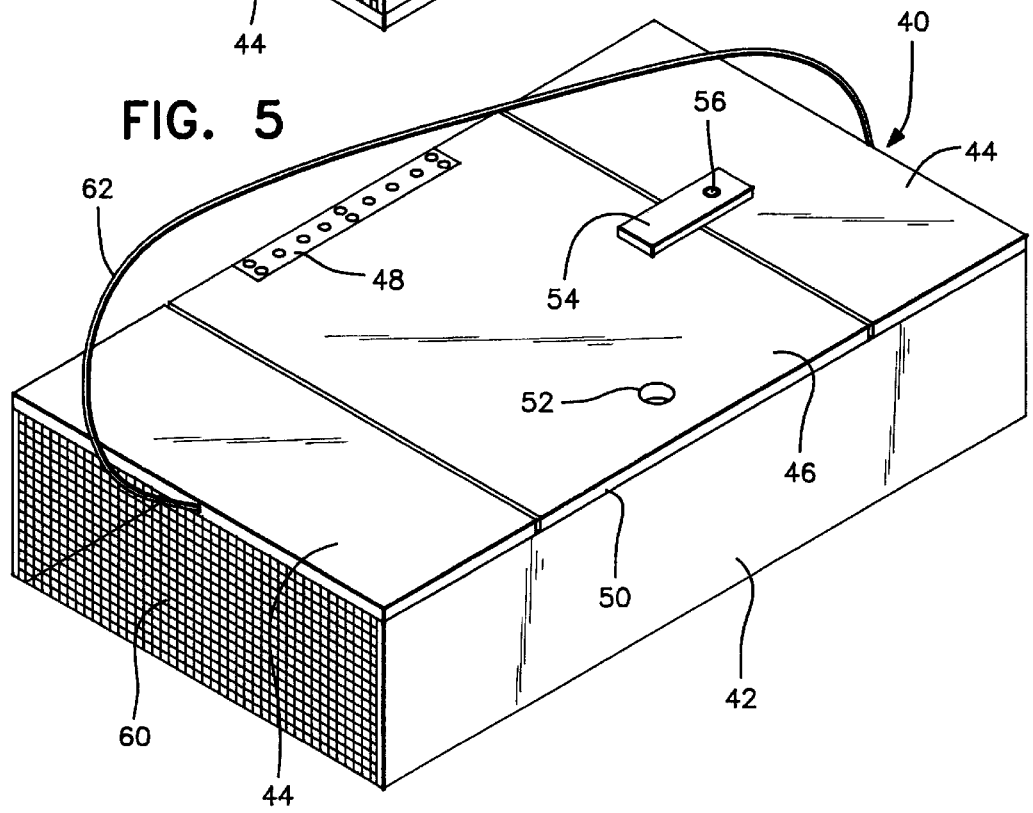
FIG. 5 is a top perspective view of the bait container.

In addition to the cooler 10 and spacer 30, the killie saver 8 also includes a bait container 40, as separately illustrated in FIGS. 4 and 5. The bait container 40 includes opposite longitudinal side walls 42 interconnected at opposite ends of their upper edges by longitudinally spaced end top wall sections 44 as illustrated in FIG. 5. An access door 46 is loosely received between the end top wall sections 44 and spans between the longitudinal side walls 42. A "living hinge" 48 is preferably secured between the longitudinal midportion of one of the longitudinal side walls 42 and the adjacent side edge of the access door 46, whereby the access door may be swung to an open position. The free swinging side edge 50 of the access door 46 is preferably provided with a finger opening 52 whereby a person's finger may be engaged in the opening 52 in order to swing the access door 46 to the open position. Other grasps or pulls can be utilized. An elongated latch member 54 is pivotally attached to one of the end top wall sections 44, as at 56, for latching the access door 46 in the closed position, as illustrated in FIG. 5. The bottom wall 58 and end walls 60 of the bait container 40 are formed of an elongated panel of hardware cloth, preferably one quarter inch mesh, or similar foraminated or screening material. The screening material spans between the bottom edges of the longitudinal side walls 42 and spans between the end edges of the side walls 42 and is secured to the bottom edges and end edges of the side walls 42 and the outer end edges of top wall sections 44 as illustrated in FIG. 4. Suitable nails or staples (not shown) secure the peripheral margins of the hardware cloth to the outer end of each top wall section 44 and the end and bottom edges, respectively, of the longitudinal side walls 42.

The side walls 42, top wall sections 44 and access door 46 are preferably constructed of wood or other suitable material so that the bait container 40 is slightly buoyant in water. Further, an elongated flexible handle 62 is provided on the bait container 40 and has its opposite ends anchored relative to the outer edges of the top wall sections 44 thereby providing a generally rectangular bait container 40 dimensioned to fit downwardly in the cooler 10 and rest on and be supported by the spacer 30 with the access door 46 being easily accessible when the top or lid 22 of cooler 10 is opened.

Figure 6:
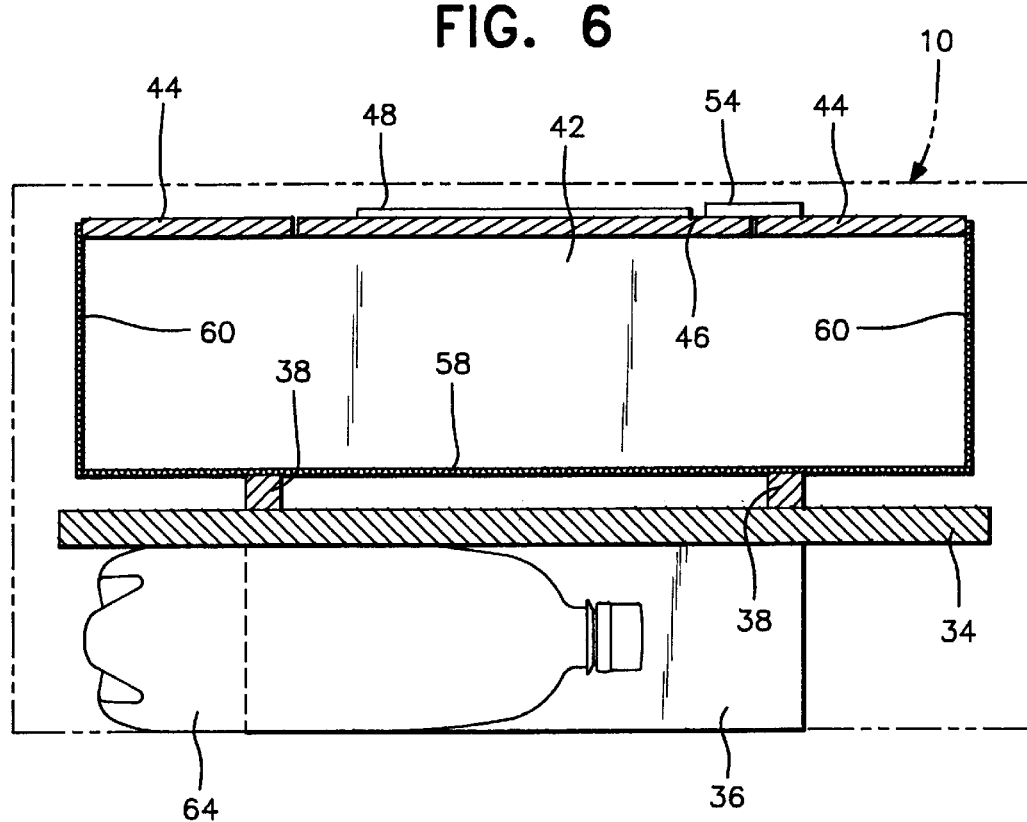
FIG. 6 is a longitudinal vertical sectional view of the spacer and bait container combination, illustrating the interior walls of the associated cooler in broken lines and a two liter bottle of ice positioned beneath the spacer and supported on the bottom of the cooler.
Figure 7:
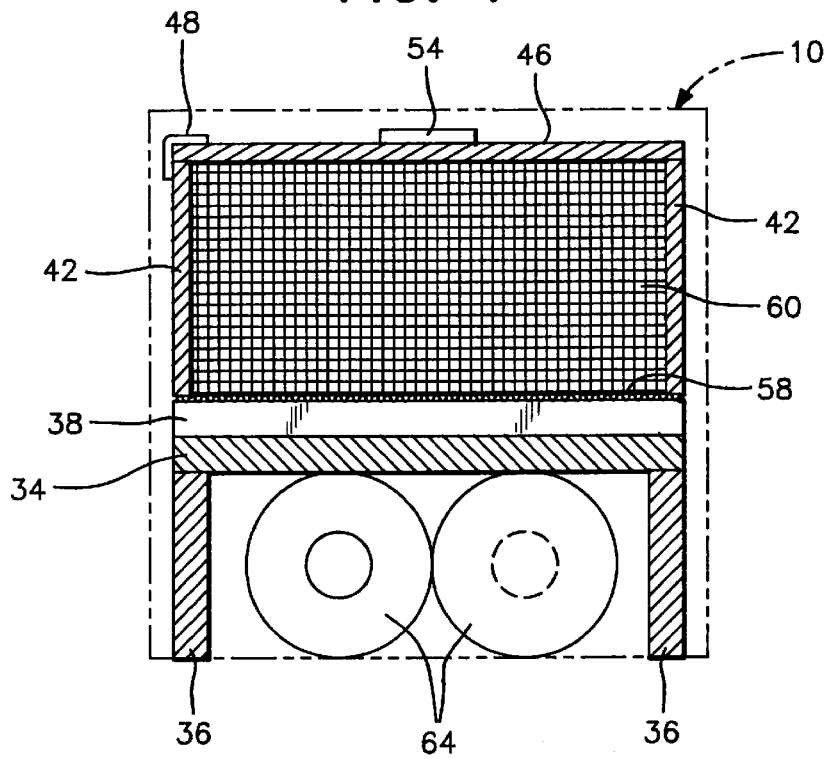
FIG. 7 is a transverse vertical sectional view of the combination illustrated in FIG. 6 with two bottles of ice positioned under the spacer.

When a fishing trip is planned, two liter plastic bottles are filled with water and frozen. If ambient temperature is below about 80° F., one bottle of ice 64 is placed on the bottom 20 of the cooler 10. The spacer 30 is inserted into the cooler 10 so that panel 34 overlies the ice bottle 64 such that the ice bottle 64 is supported on the bottom wall 20 of the cooler 10 between the support legs 36 of spacer 30. When the ambient air temperature is above 80° F., a pair of two liter plastic bottler 64 filled with ice is preferably used, as illustrated in FIG. 7 to maintain the killies in live condition. When the temperature is below 80°, the use of two bottles of ice 64 may increase the fatality rate of the killies due to freezing or lowering their temperature below their survival temperature. The bait container 40 with a number of salt water minnows or killies therein is placed in the cooler 10 and supported on the spacer bars 38 on spacer 30 in spaced relation to panel 34 in the manner illustrated in FIGS. 6 and 7. The weight of the bait container 40 is supported from the spacer bars 38 of the spacer 30 so that air cooled by the ice container or containers 64 can circulate through the screened bottom 58 and end walls 60 of the bait container 40 to maintain the killies in a live condition for use as bait when fishing. Also, the screened bottom 58 and end walls 60 of the bait container 40 defined by the hardware cloth is spaced above the panel 34 and any liquid or bait waste within the bait container 40 may drain freely through the screened bottom wall 58, except in those small areas of the bottom wall 58 which rest upon the spacer bars 38. Even when two 2 liter bottles of ice are employed, there is space on the bottom wall 20 to support other type of bait such as worms, squid or the like. The ice bottle or bottles 64 will keep this additional bait cold and in usable condition.

Because the cooler 10 is insulated and contains the ice bottle or bottles 64, the temperature within the cooler 10 remains 35° F. to 40° F. and the killies contained within the bait container 40 will be maintained alive for up to 12 hours. Further, the spacer 30 fully separates the bait container 40 from the ice bottle or bottles 64 so that there is no direct contact between the ice and the killies or bait in the bait container. By maintaining the killies at a temperature between 35° F. and 40° F. and also utilizing the screened bottom wall 58 and end walls 60 to permit circulation of cooled air and to drain water and waste from the killies, the killies may be maintained alive out of water for a length of time exceeding the usual duration of a fishing trip.

By supporting the killies in a substantially dry bait container within a cooled humid environment in the cooler 10, it is unnecessary to remove the bait container 40 from the cooler 10 and place the bait container 40 overboard into the water each time a new fishing site is reached. Also, this eliminates the necessity of lifting the bait container from the water and placing a wet bait container on the deck within the boat each time a fisherman moves from one fishing site to another. Consequently, since it is unnecessary to remove the bait container 40 from the cooler 10 and to place the bait container 40 overboard into the water each time a new fishing site is reached, the opportunity to lose a bait box in the water as a fisherman moves from one fishing site to another is eliminated. Elimination of the necessity to place the bait container 40 overboard when fishing eliminates the possibility of the bait container 40 damaging the boat, becoming entangled with the fishing gear or boat propeller and eliminates the bait container being pulled through the water at high speed when traveling to a new fishing site which deprives the killies of life sustaining air resulting in a high fatality rate. Further, noting that this invention may retain killies alive up to 12 hours, when an 8 hour fishing trip is terminated and the fisherman returns to the dock and has killies in the bait container 40, it is merely necessary for the fisherman to remove the bait container 40 from the cooler 10 and to again float the bait container 40 in the body of water at his dock to maintain the killies in live condition for use during the next fishing trip.

In order to reduce the number of times that the cooler lid 22 is opened to obtain bait when fishing, a number of killies can be removed from the bait container 40 when the cooler is opened and placed in a separate container with water and/or ice so that bait can be applied to the fishhook several times before it becomes necessary to open the cooler. A supply of killies can be placed in the bait container 40 and the container tethered to the dock thereby avoiding the delay of obtaining the killies just prior to embarking on a fishing trip since it is only necessary to lift the bait container 40 and place it in the cooler on the spacer 30, close the cooler and place the killie saver 8 in the boat.

The killie saver 8 can also be effectively used when fishing from the bank of a body of water or when fishing from a pier, dock or bridge. Also, various types of packaged ice, ice cubes or the like can be placed in the cooler 10.

The foregoing is considered as illustrative only of the principles of the invention. Further, numerous modifications and changes readily will occur to those skilled in the art. For example, while two spacer bars 38 are preferred, more than two could be utilized. Further, if formed of plastic or other moldable material, spacer 30 readily lends itself to one-piece molding. Therefore, it is not desired to limit the invention to the exact construction and operation shown and described, and, accordingly, all suitable modifications and equivalents may be resorted to, falling within the scope of the invention.

What is claimed as new is as follows:

1. A killie saver comprising an insulated cooler having upstanding peripheral sides, a generally horizontal bottom and an openable top for opening and closing said cooler, a spacer including a generally rectangular panel loosely fitted within said cooler in a manner to permit air circulation past the panel, said spacer having an upper surface from which a spacer bar is supported and also including depending support legs connected to said panel to support said panel in an elevated generally horizontal position above said bottom and defining a storage space between said bottom and said panel, a generally rectangular bait container defining an enclosed space for receiving a plurality of killies and including a top surface having an access opening and an openable closure door, and a screened bottom portion, said bait container removably fitted within said cooler and supported by said spacer bar, and an enclosed quantity of ice supported on said bottom within said storage space.

2. The killie saver as defined in claim 1 wherein said spacer bar includes a pair of generally parallel, laterally spaced spacer bars, said screened bottom portion of said bait container being supported on said spacer bars in spaced relation to said panel to permit circulation of cooled air through the bait container and drainage of water and waste from the bait container.

3. The killie saver as defined in claim 2 wherein said quantity of ice includes at least one two liter plastic bottle filled with water frozen into a solid ice block before placement in the cooler.

4. The killie saver as defined in claim 1 wherein said generally rectangular bait container includes a pair of generally parallel upstanding side walls having corresponding top, bottom and end edges, a pair of horizontally spaced, generally horizontal top wall sections spanning between and anchored relative to corresponding ends of top edges of said side walls to form said access opening, said openable closure door disposed between said top wall sections and spanning said access opening, said screened bottom portion including a screened bottom wall and screened end walls spanning between and anchored to said side walls and top wall sections, said closure door being accessible when the cooler top is opened to provide access to the interior of the bait container.

5. The killie saver of claim 4 wherein said closure door is hinged from a longitudinal midportion of one of said side walls.

6. The killie saver as defined in claim 5 wherein said spacer bar includes a pair of generally parallel, laterally spaced spacer bars, said screened bottom portion of said bait container being supported on said spacer bars in spaced relation to said panel to permit circulation of cooled air through the bait container and drainage of water and waste from the bait container.

7. The killie saver as defined in claim 6 wherein said quantity of ice includes at least one two liter plastic bottle filled with water frozen into a solid ice block before placement in the cooler.

8. A spacer for insertion into an insulated cooler, said cooler having upstanding peripheral sides that define a vertical height, a generally horizontal bottom and removable top to enable the cooler to function as a long term, water free storage facility for live bait contained within a bait container generally fitted to be received within an upper portion of said cooler and having a screened bottom portion, said spacer including a generally rectangular panel sized to loosely fit within said cooler, generally vertical support legs depending downwardly from said panel and at spaced locations for supporting said panel in an elevated position generally parallel to said bottom near a middle of the vertical height of said cooler, the spacing between said depending support legs defining a storage space for receiving packaged ice therein, and spacer bars on said rectangular panel removably supporting said bait container above said panel with said screened bottom portion spaced above said panel.

9. The spacer as defined in claim 8 wherein said generally vertical support legs comprise laterally spaced depending side walls mounted on said horizontal panel with the storage space defined between said side walls receiving said ice.

10. The spacer as defined in claim 9 wherein said ice includes at least one plastic bottle filled with water frozen into ice and removably received in said storage space.

11. The spacer as defined in claim 1, wherein said generally rectangular panel is a solid panel.

12. The killie saver as defined in claim 8, wherein said generally rectangular panel is a solid panel.

13. In combination, a spacer having a generally rectangular panel and support and spacing elements, a generally rectangular bait container for fully enclosing a quantity of killies and having a top-mounted access door and a screened bottom portion, and a covered insulated cooler for receiving the spacer and the bait container to function as a water free storage facility for live bait contained within said bait container;

said support elements including at least two generally vertical support legs depending downwardly from said panel and at spaced locations for supporting said panel in an elevated position near a middle of a vertical height of said cooler, said panel sized to loosely fit within said cooler, the spacing between said depending support legs defining a storage space for receiving packaged ice therein;

said spacing element on an upper side of said panel for supporting said screened bottom portion of said bait container in spaced relation to said panel to permit circulation of cooled air through said bait container and drainage of water and waste from said bait container.

14. The combination as set forth in claim 13, wherein said generally rectangular panel is a solid panel.

15. The combination as set forth in claim 13, wherein said spacing element includes at least two generally parallel, laterally spaced spacer bars.

16. The combination as set forth in claim 13 wherein said generally rectangular bait container includes a pair of generally parallel upstanding side walls having corresponding top, bottom and end edges, a pair of horizontally spaced, generally horizontal top wall sections spanning between and anchored relative to corresponding ends of top edges of said side walls to form an access opening, said access door disposed between said top wall sections and spanning said access opening, said screened bottom portion including a screened bottom wall and screened end walls spanning between and anchored to said side walls and top wall sections, said access door being accessible when the cooler top is opened to provide access to the interior of the bait container.

\* \* \* \* \*